United States Patent [19]

Kodama et al.

[11] Patent Number: 4,713,045
[45] Date of Patent: Dec. 15, 1987

[54] AUTO-TENSIONER FOR BELT SYSTEMS AND A METHOD FOR ADJUSTING TENSION DEGREE

[75] Inventors: Hisashi Kodama, Nagoya; Yoshio Okabe, Chiryu, both of Japan

[73] Assignees: Aisin Seiki Kabushiki Kaisha, Kariya; Toyota Jidosha Kabushiki Kaisha, Toyota, both of Japan

[21] Appl. No.: 913,461

[22] Filed: Sep. 30, 1986

[30] Foreign Application Priority Data

Sep. 30, 1985 [JP] Japan ................... 60-217518

[51] Int. Cl.⁴ ............................................. F16H 7/12
[52] U.S. Cl. ............................................. 474/135
[58] Field of Search ............... 474/135, 133, 111, 109, 474/101

[56] References Cited

U.S. PATENT DOCUMENTS

| | | | |
|---|---|---|---|
| 660,570 | 10/1900 | Green | 474/135 |
| 4,033,196 | 7/1977 | Maeda | 474/135 |
| 4,077,272 | 3/1978 | Busso | 474/135 X |

FOREIGN PATENT DOCUMENTS

| | | | |
|---|---|---|---|
| 0279415 | 3/1952 | Switzerland | 474/135 |
| 8302308 | 7/1983 | World Int. Prop. O. | 474/135 |

*Primary Examiner*—Stephen J. Novosad
*Assistant Examiner*—Thuy M. Bui
*Attorney, Agent, or Firm*—Oblon, Fisher, Spivak, McClelland, & Maier

[57] ABSTRACT

An auto-tensioner for belt systems and a method for adjusting the belt tension, said auto-tensioner comprising an idler pulley, a tensioner body, a bracket fixed to the tensioner body and swingable around a first fixing bolt, a second fixing bolt inserted in a slit of the bracket so as to adjust the swing degree of the bracket, and a third bolt for positioning the idler pulley; while said adjusting method comprising the steps of making the first and second fixing bolts to be half-tightened state, tightening the third bolt to position the idler pulley, adjusting the spring force for biasing the bracket, fully tightening the first and second fixing bolts, and finally removing the third positioning bolt, thereby to avoid the troublesomeness in the adjusting works of belt tension.

1 Claim, 2 Drawing Figures

AUTO-TENSIONER FOR BELT SYSTEMS AND A METHOD FOR ADJUSTING TENSION DEGREE

BACKGROUND OF THE INVENTION

1. Field of the Invention

The present invention relates to an auto-tensioner for belt systems such as a timing-belt device and a V-shaped belt device, particularly, a belt system which controlls the belt tension by using an idler.

2. Description of the Prior Art

FIG. 2 shows one example of conventional auto-tensioner devices, which is disclosed in the Japanese Laid-open Patent Bulletin Jitsu-ko-sho 60-52458. In this auto-tensioner device, bracket 1 fixed to the vehicle body side supports auto-tensioner 2 by screw 3 and lock nut 4. Pulley holder 5 is pivotally fixed to bracket 1, and piston 6 is contacted with pulley holder 5. Idler pulley 7, which is rotatably held by pulley holder 5, is contacted with and pushed to the unfastened side of belt 8. Pulley holder 5 is equipped with spring 9 which is fixed to a fast member at its one end, thereby pulley holder being biased.

However, in the conventional auto-tensioner having such construction as mentioned in FIG. 2, the position of the tensioner has to be adjusted by screw 3 and lock nut 4 for setting tension, as tensioner 2 is fixed to a fast bracket 1. In this adjustment, the protruding degree of piston 6 has to be adjusted while rotating belt 8, by starting an engine. This makes the adjustment of tensioner to be troublesome especially in a mass-production line.

SUMMARY OF THE INVENTION

The object of the present invention is to provide an auto-tensioner by which problems in the adjusting work of the degree of tension can be avoided.

In accordance with the present invention, an idler-pulley is fixed firmly to a bracket and the bracket is so arranged to be swingable around a first fixing bolt fixed to a fast member. On the bracket, there is formed a first slit-like opening for inserting a second fixing bolt therein and a pivotal point for making the idler pulley to be swingable. Further, there is provided a third bolt inserted into a second slot-like opening formed on the bracket for positioning the idler pulley as a means for positioning the tensioner unit and a spring for setting the starting degree of tension.

The adjustment of the degree of tension is performed by following steps, namely, the first fixing bolt of the bracket and the second fixing bolt inserted in the first slit-like opening are brought to half-tightened state at the beginning; the rod of the auto-tensioner is contacted with the idler pulley and further pushed into the idler pulley by some extent (by about half way of the stroke of rod); the bolt for positioning the idler pulley is tightened; the spring force is adjusted; the first fixing bolt and the second fixing bolt in a half-tightened state are fully tightened; and finally the positioning bolt is removed.

The above construction of the auto-tensioner and the method for adjusting the degree of tension make it possible to greatly reduce the number of adjusting processes, as adequate positioning of tensioner and adequate setting of starting tension degree can be achieved by removing the bolt for positioning. Further, while the adjusting stroke of auto-tensioner should be largely decided by the factors such as the difference of heat expansion between the belt and the engine, the change in length of the belt and other parts due to the passage of time and dimensional errors of the belt and other parts, the auto-tensioner and the adjusting method according to the present invention make it possible to eliminate the dimensional errors which are the most important factor, thereby making the tensioner-stroke and the shape of the device small.

The foregoing and other objects, features and advantages of the present invention will be understood more clearly and fully from the following detailed description of preferred embodiments with reference to the attached drawings.

DESCRIPTION OF PREFERRED EMBODIMENT

Figure 1:
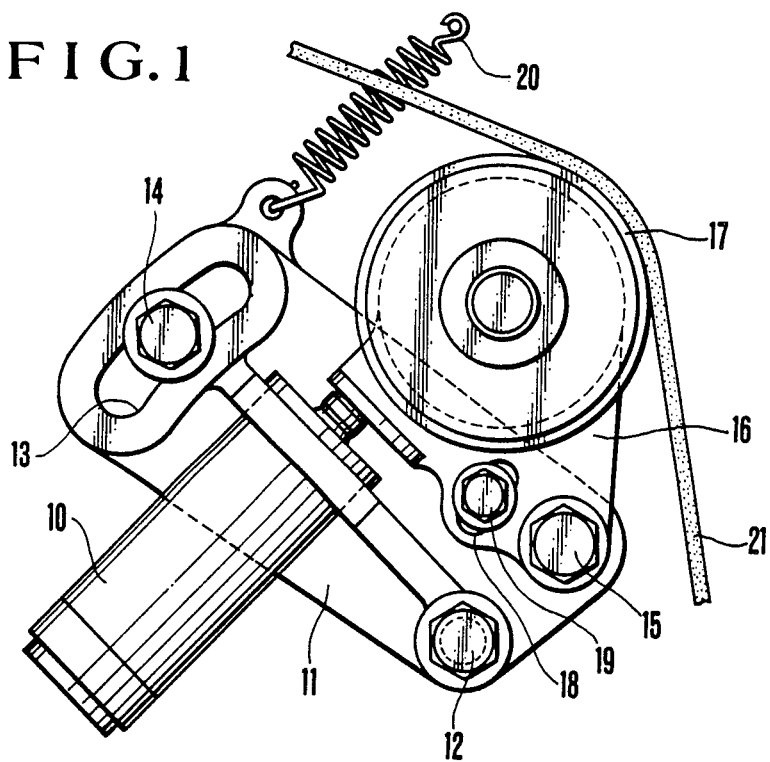
FIG. 1 shows the side view of one embodiment of the auto-tensioner in accordance with the present invention.
Figure 2:
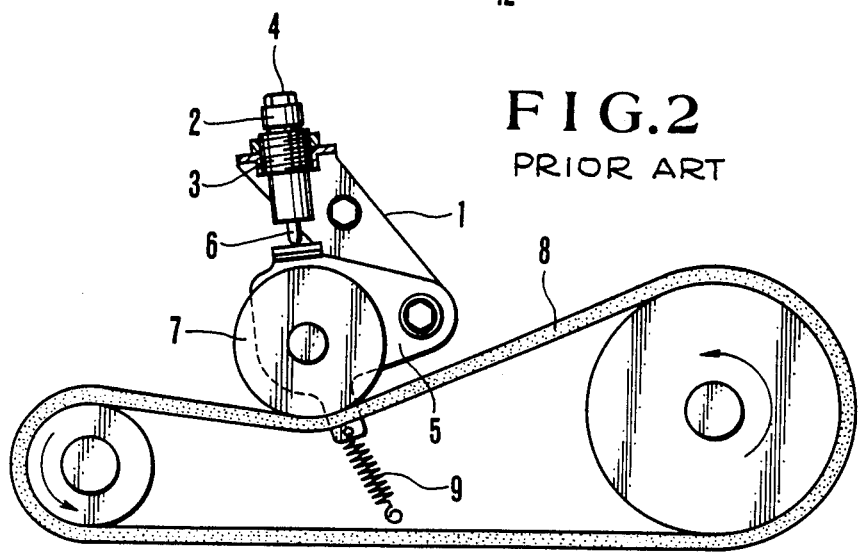
FIG. 2 shows the side view of the example of conventional auto-tensioner.

Referring to FIG. 1, auto-tensioner body 10 with a rod to be pushed into the idler pulley bracket is pressfitted to bracket 11 which is swingable around first fixing bolt 12 fixed to a fast member. In bracket 11, there is formed curved slit 13 in which the second fixing bolt 14 is inserted. The curvature of slit 13 forms a circle around bolt 12. Bracket 11 assumes a fixed position when bolt 14 is tightened, while it becomes swingable around first fixing bolt 12 when bolt 14 is loosened.

Idler pulley 17 supported by bracket 16 is swingable around pivot 15 formed on bracket 11. Bracket 16, being connected with bracket 11 through slit 18 by third bolt 19, is fixed to bracket 11 when bolt 19 is tightened. A setting spring 20 biases bracket 11 so that bracket 11 swings around bolt 12 and the end of rod of auto-tensioner body 10 contacts with bracket 16. Numeral 21 is a belt which is to be tensioned by idler pulley 17.

For setting the tension degree, brackets 11 and 16 are fixed by tightening the positioning bolt 19 under the condition that the rod of auto-tensioner body 10 is pushed by half a stroke, so that such assume the engine-set position. When an engine is put on, the first fixing bolt 12 at a pivotal point for the swing of bracket 11 and the second fixing bolt 14 are brought to a half-tightened state; and then they are fully tightened under the condition that idler pulley 17 is pushed to belt 21 by setting spring 20. Finally the third bolt 19 is removed. Incidentally, even if bolt 19 is merely loosened, the same setting effect can be obtained. By these setting steps, tensioner body 10 is set at a desired position and idler pulley 17 becomes swingable around pivot 15 in a condition such that it contacts with belt 21.

It should be understood that, although the preferred embodiment of the present invention has been described herein in considerable detail, certain modifications, changes, and adaptations may be made by those skilled in the art and that it is hereby intended to cover all modifications, changes and adaptations thereof falling within the scope of the appended claims.

What is claimed is:

1. An auto-tensioner for belt systems, comprising:
   an idler pulley for tensioning a belt and swingable around a pivotal point formed on a bracket,
   an auto-tensioner body fixed firmly to said bracket and having a rod for pushing said idler pulley, a first bolt fixed to a fast member and around which said bracket is swingable, a second bolt inserted in a first slit-like opening formed on said bracket, a third bolt inserted in a second slit-like opening formed on said bracket for setting said swingable idler pulley at a desired position, and a spring connected with said bracket for setting a starting tension degree of belt, and said third bolt being removed or loosened after setting the starting tension degree of belt.

* * * * *